(12) United States Patent
Allen et al.

(10) Patent No.: US 12,455,010 B2
(45) Date of Patent: Oct. 28, 2025

(54) SEAL ARRANGEMENT

(71) Applicant: Schaeffler Technologies AG & Co. KG, Herzogenaurach (DE)

(72) Inventors: Natalie Allen, Wadsworth, OH (US); Joshua Verdier, Lodi, OH (US); Edward Goodwill, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/443,403

(22) Filed: Feb. 16, 2024

(65) Prior Publication Data
US 2025/0122935 A1    Apr. 17, 2025

Related U.S. Application Data

(60) Provisional application No. 63/543,690, filed on Oct. 11, 2023.

(51) Int. Cl.
*F16J 15/06*    (2006.01)

(52) U.S. Cl.
CPC ..................... *F16J 15/06* (2013.01)

(58) Field of Classification Search
CPC ........................................................ F16J 15/06
See application file for complete search history.

(56) References Cited

U.S. PATENT DOCUMENTS

| | | | | |
|---|---|---|---|---|
| 2,270,927 A | * | 1/1942 | Browne | F16L 27/087 285/190 |
| 3,285,614 A | * | 11/1966 | McClenathan | F16J 15/3484 277/368 |
| 3,756,673 A | * | 9/1973 | Strub | F16J 15/44 384/138 |
| 4,635,969 A | * | 1/1987 | Jackson | F26B 13/183 285/190 |

(Continued)

FOREIGN PATENT DOCUMENTS

| | | |
|---|---|---|
| CN | 208565562 U | 3/2019 |
| DE | 112013000259 B3 | 7/2022 |
| DE | 112016000259 B4 | 7/2022 |

OTHER PUBLICATIONS

Author: Eagleburgmann ED560 Seal Technical Specification Sheet. May 10, 2023.

(Continued)

*Primary Examiner* — Vishal A Patel
(74) *Attorney, Agent, or Firm* — Kevin L. Parks

(57) ABSTRACT

A seal arrangement includes a housing defining a cavity and having a flow channel extending through the housing to the cavity. The seal arrangement further includes a seal plate non-rotatably connected to the housing. The seal arrangement further includes a biasing element disposed in the cavity and axially aligned with the flow channel. The biasing element is configured to permit fluid to flow radially therethrough into the flow channel. The seal arrangement further includes a first seal disposed in the cavity and between the (Continued)

biasing element and the seal plate, and a second seal disposed in the cavity and between the biasing element and a radially extending wall of the housing. The biasing element is configured to bias the first seal against the seal plate and to bias the second seal against the radially extending wall of the housing.

16 Claims, 1 Drawing Sheet

(56) References Cited

U.S. PATENT DOCUMENTS

| | | | | |
|---|---|---|---|---|
| 4,744,721 | A * | 5/1988 | Villeneuve | F04D 29/128 |
| | | | | 277/431 |
| 7,219,898 | B2 | 5/2007 | Mormile et al. | |
| 7,549,836 | B2 * | 6/2009 | Anderson | F16J 15/008 |
| | | | | 415/113 |
| 2017/0362949 | A1 * | 12/2017 | Von Berg | F16J 15/24 |
| 2021/0348656 | A1 * | 11/2021 | Goto | F16J 15/3204 |

OTHER PUBLICATIONS

Author: Eagleburgmann M74-D Seal Technical Specification Sheet. Sep. 8, 2023.

* cited by examiner

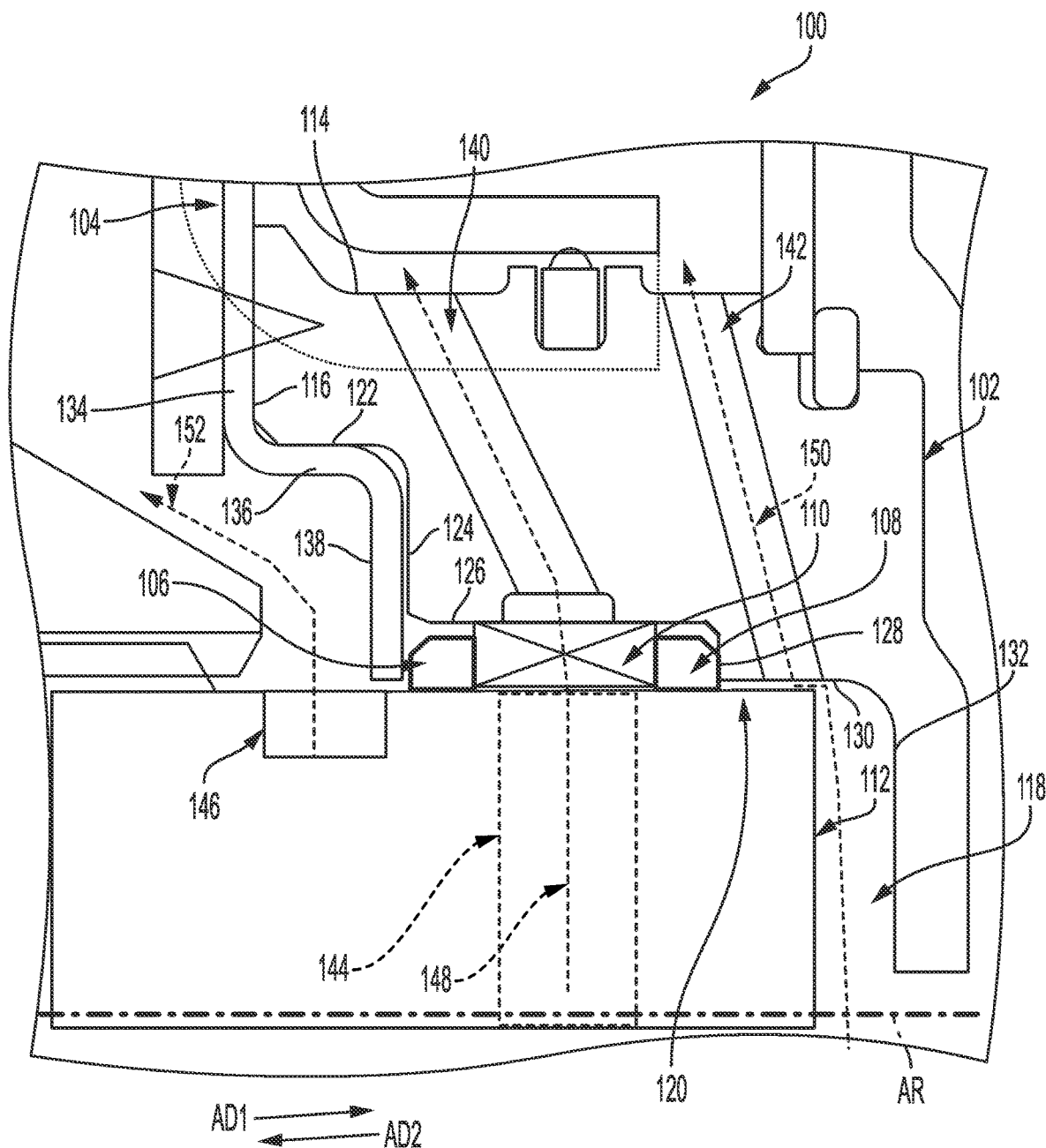

SEAL ARRANGEMENT

CROSS-REFERENCE TO RELATED APPLICATIONS

This application claims the benefit of U.S. Provisional Patent Application No. 63/543,690, filed Oct. 11, 2023, the disclosure of which is incorporated in its entirety by reference herein.

TECHNICAL FIELD

The present disclosure relates to a seal arrangement between a shaft and a housing, and, more specifically, to a seal arrangement having a spring configured to axially bias two seals while permitting fluid to flow radially between the two seals.

BACKGROUND

Mechanical and bellow seals are typically used to prevent leakage between a rotating shaft and a static housing. These seals typically include a biasing element configured to apply an axial force to a sealing element such that an optimal gap is maintained between sealing element and the shaft and/or housing that prevents leakage through the sealing element while also permitting lubrication of the sealing element. However, as a result of a change in fluid pressure on one axial side of the sealing element, the seal may be subjected to a shuttling effect, i.e., the seal may be displaced axially such that leakage may occur. Therefore, it is desirable to have alternate designs to reduce the possibility of a seal being subjected to the shuttling effect when a fluid pressure change occurs, thereby reducing a possibility of leakage through the seal.

SUMMARY

Embodiments of the present disclosure provide a seal arrangement including a housing, a seal plate, a biasing element, a first seal, and a second seal. The housing defines a cavity and includes a flow channel extending through the housing to the cavity. The seal plate is non-rotatably connected to the housing. The biasing element is disposed in the cavity and is axially aligned with the flow channel. The biasing element is configured to permit fluid to flow radially therethrough into the flow channel. The first seal is disposed in the cavity and between the biasing element and the seal plate. The second seal is disposed in the cavity and between the biasing element and a radially extending wall of the housing. The biasing element is configured to bias the first seal against the seal plate and to bias the second seal against the radially extending wall of the housing.

In embodiments, the cavity may be configured to receive a shaft. The shaft may be configured to radially compress the first and second seal against an axially extending wall of the housing. The shaft may be configured to be radially spaced from the housing and the seal plate.

In embodiments, the seal arrangement may be configured to include a first flow path extending through the flow channel and between the first and second seals, and a second flow path spaced from the first flow path. The second flow path may be sealed from the first flow path via the first seal. The biasing element may be configured to maintain contact between the first seal and the seal plate in response to a change in fluid pressure in the second flow path. The seal arrangement may be configured to include a third flow path spaced from the first and second flow paths. The third flow path may be sealed from the first flow path via the second seal. The biasing element may be configured to maintain contact between the second seal and the radially extending wall of the housing in response to a change in fluid pressure in the third flow path. The first flow path may pass through the biasing element.

In embodiments, the cavity may be configured to receive a shaft having an outlet channel configured to expel pressurized fluid. The biasing element may be arranged radially between the outlet channel and the flow channel. The outlet channel may be configured to be axially aligned with the flow channel.

In embodiments, the biasing element may be a wave spring. In embodiments, the cavity may be configured to receive a shaft having an outlet channel configured to expel repressurized fluid. The first seal may be arranged axially between the biasing element and the outlet channel. In embodiments, flow channel may be configured to receive pressurized fluid from a shaft.

In embodiments, the housing may include a further flow channel extending through the housing and into the cavity. The second seal may be arranged axially between the further flow channel and the flow channel. The further flow channel may be configured to expel pressurized fluid towards a shaft.

Embodiments of the present disclosure further provide a method of assembling a seal arrangement including providing a housing defining a cavity and including a flow channel extending therethrough into the cavity. The method further includes inserting a seal into the cavity. The seal contacts an axially extending wall and a radially extending wall of the housing in the cavity. The method further includes inserting a biasing element into the cavity. The biasing element contacts the seal and is axially aligned with the flow channel. The method further includes inserting a further seal into the cavity. The further seal contacts the axially extending wall and the biasing element. The method further includes providing a seal plate. The seal plate contacts the housing and the further seal. The method further includes non-rotatably connecting the seal plate to the housing.

In embodiments, the seal arrangement may be configured to include a first flow path extending through the flow channel and between the first and second seals, and a second flow path spaced from the first flow path. The second flow path may be sealed from the first flow path via the first seal. The biasing element may be configured to maintain contact between the first seal and the seal plate in response to a change in fluid pressure in the second flow path. The seal arrangement may be configured to include a third flow path spaced from the first and second flow paths. The third flow path may be sealed from the first flow path via the second seal. The biasing element may be configured to maintain contact between the second seal and the radially extending wall of the housing in response to a change in fluid pressure in the third flow path.

Embodiments of the present disclosure provide the advantageous benefit of reducing a likelihood of leakage resulting from shuttling effect, for example, by providing a seal arrangement with a spring configured to bias seals axially away from each other while permitting radially flow between the seals. Further embodiments disclosed herein offer design advantages by minimizing an envelope of the seal arrangement, which can satisfy packaging constraints, while reducing a likelihood of leakage through the seal arrangement.

BRIEF DESCRIPTION OF THE DRAWINGS

The FIGURE shows a partial cross-sectional view of a seal arrangement according to an exemplary embodiment of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Referring to the FIGURE, an exemplary embodiment of a seal arrangement 100 is shown. At least some portions of the seal arrangement 100 are rotatable about an axis of rotation AR. While only a portion of the seal arrangement 100 above the axis of rotation AR is shown in FIG. 1, it should be understood that the seal arrangement 100 can appear substantially similar below the axis of rotation AR with many components extending about the axis of rotation AR. Words such as "axial," "radial," "circumferential," "outward," etc. as used herein are intended to be with respect to the axis of rotation AR.

The seal arrangement 100 includes a housing 102, a seal plate 104, a first seal 106, a second seal 108, and a biasing element 110. The seal arrangement 100 is configured to engage a shaft 112. The housing 102 includes a radially outer surface 114 radially spaced from the axis of rotation AR. The housing 102 further includes an axial side wall 116 extending radially inward from the radially outer surface 114. The axial side wall 116 is radially spaced from the axis of rotation AR. The housing 102 defines a cavity 118 extending radially from the axis of rotation AR to the axial side wall 116. The cavity 118 is designed, i.e., sized and shaped, to house an end 120 of the shaft 112. That is, the housing 102 is configured to receive the end 120 of the shaft 112.

The housing 102 may include a first axially extending wall 122 extending axially from the axial side wall 116. The first axially extending wall 122 may define an outer diameter of the cavity 118. The housing 102 may further include a first radially extending wall 124 extending radially inward from the first axially extending wall 122. The housing 102 includes a second axially extending wall 126 radially spaced from the shaft 112. The second axially extending wall 126 may extend axially from the first radially extending wall 124. In an alternative embodiment, the housing 102 may lack the first axially extending wall 122 and the first radially extending wall 124 such that the second axially extending wall 126 extends radially from the axial side wall 116. The housing 102 further includes a second radially extending wall 128 extending radially inwardly from the second axially extending wall 126, a third axially extending wall 130 extending axially from the second radially extending wall 128, and an end wall 132 extending radially inwardly from the third axially extending wall 130. The end wall 132 may include an opening (not numbered) concentric with the axis of rotation AR. That is, the end wall 132 may extend annularly about the axis of rotation AR.

The housing 102 further includes a first flow channel 140 and a second flow channel 142 axially spaced from the first flow channel 140. The first flow channel 140 extends through the housing 102 from the second axially extending wall 126 to the radially outer surface 114. The second flow channel 142 extends through the housing 102 from the second radially extending wall 128 to the radially outer surface 114. The first flow channel 140 lacks fluid communication with the second flow channel 142 within the housing 102. That is, the first and second fluid flow channels are separate from each other within the housing 102.

The seal plate 104 is non-rotatably connected, e.g., via a welded connection, to the axial side wall 116 of the housing 102. The seal plate 104 may include a first radially extending portion 134 that extends along and is non-rotatably connected to the axial side wall 116. The seal plate 104 may further include an axially extending portion 136 that extends axially from the first radially extending portion 134. The axially extending portion 136 may contact the first axially extending wall 122 of the cavity 118. The seal plate 104 may further include a second radially extending portion 138 extending radially inward from the axially extending portion 136. The second radially extending portion 138 may contact the first radially extending wall 124 of the housing 102. The second radially extending portion 138 may be radially spaced from the shaft 112. The second radially extending portion 138 may be engaged with the first seal 106, as discussed further below.

In the alternative embodiment in which the housing 102 lacks the first axially extending wall 122, the seal plate 104 lacks the axially extending portion 136 such that the axial side wall 116 extends radially to the second axially extending wall 126. In such an example, the seal plate 104 extends radially along the axial side wall 116 and radially inward of the second axially extending wall 126. That is, the seal plate 104 may include one continuous radially extending portion that is non-rotatably connected to the axial side wall 116, engaged with the first seal 106, and radially spaced from the shaft 112.

The end 120 of the shaft 112 is arranged in the cavity 118. The shaft 112 is radially spaced from the third axially extending wall 130. The shaft 112 further extends axially beyond the second radially extending wall 128. The shaft 112 is further axially spaced from the end wall 132, which may permit pressurized fluid to be routed between the shaft 112 and the end wall 132 and flow into the second flow channel 142. Additionally, or alternatively, pressurized fluid may be routed away from the second flow channel 142, e.g., out of the opening in the end wall 132.

The shaft 112 includes a first outlet channel 144 extending radially through an outer diameter of the shaft 112. The first outlet channel 144 is configured to expel fluid from the shaft 112. The first outlet channel 144 is axially aligned with the first flow channel 140 such that the first outlet channel 144 and the first flow channel 140 are in fluid communication with each other. Specifically, pressurized fluid may be supplied from the shaft 112 and routed to the first flow channel 140 via the first outlet channel 144.

The shaft 112 further includes a second outlet channel 146 axially spaced from the first outlet channel 144. The first outlet channel 144 is disposed axially between the second flow channel 142 and the second outlet channel 146. The second outlet channel 146 is extends radially through the outer diameter of the shaft 112 and is configured to receive pressurized fluid flow into the shaft 112. The seal plate 104 is arranged, at least partially, between the second outlet channel 146 and the first seal 106. For example, the seal plate 104, e.g., the second radially extending portion 138, may radially overlap the second outlet channel 146, as shown in the FIGURE. Alternatively, the seal plate 104, e.g., the second radially extending portion 138, may be arranged entirely axially between the second outlet channel 146 and the first seal 106.

The first seal 106 is arranged between the biasing element 110 and the seal plate 104, e.g., the second radially extending portion 138. The first seal 106 seals the shaft 112 to the second axially extending wall 126. Specifically, the first seal 106 is configured to maintain fluid separation between the second outlet channel 146 and the first flow channel 140.

The second seal 108 is arranged between the biasing element 110 and the second radially extending wall 128. The second seal 108 seals the shaft 112 to the second axially extending wall 126. Specifically, the second seal 108 is configured to maintain fluid separation between the second flow channel 142 and the first flow channel 140. The first and second seals 106, 108 may be any suitable type of seal, e.g., a dynamic square seal. The first and second seals 106, 108 may be substantially identical to each other.

The first seal 106 may include a chamfer (not numbered) arranged on a side of the first seal 106 facing the seal plate 104. The second seal 108 may include a chamfer (not numbered) arranged on a side of the second seal 108 facing the second radially extending wall 128. The chamfers may direct forces created by thermal expansion of the seals 106, 108 during operation both axially and radially, which can assist in the sealing the first flow channel 140 from the second output channel 146 and the second flow channel 142.

The biasing element 110 is axially aligned with the first flow channel 140 and the first outlet channel 144. That is, the biasing element 110 is arranged radially between the first flow channel 140 and the first outlet channel 144. The biasing element 110 is configured to permit pressurized fluid to flow from the first outlet channel 144 to the first flow channel 140. That is, the pressurized fluid may flow out of the first outlet channel 144 and then be routed through the biasing element 110 and into the first flow channel 140. The biasing element 110 may be, e.g., a wave spring.

The biasing element 110 is configured to axially bias the first seal 106 and the second seal 108 away from each other. Specifically, the biasing element 110 is configured to retain axial positions of the first and second seals 106, 108 despite a change in pressure of fluid flowing around the first and second seals 106, 108, e.g., into the second outlet channel 146. For example, since the shaft 112 is radially spaced from the third axially extending wall 130, the pressurized fluid flowing out of the second flow channel 142 may exert a force on the second seal 108 in a first axial direction AD1, i.e., towards the axial side wall 116. The biasing element 110 is configured to bias the first seal 106 against the seal plate 104 such that the first seal 106 remains in contact with the seal plate 104. Since the seal plate 104 is radially spaced from the shaft 112, the pressurized fluid flowing into the shaft 112 may exert a force on the first seal 106 in a second, opposite axial direction AD2, i.e., towards the end wall 132. The biasing element 110 is configured to bias the second seal 108 against the housing 102, e.g., the second radially extending wall 128, such that the second seal 108 remains in contact with the housing 102.

The biasing element 110 may be in direct contact with the first and second seals 106, 108. In an alternative embodiment, the biasing element 110 may be in indirect contact with the first and second seals 106, 108, e.g., via intermediate components. For example, the seal arrangement 100 may further include a first side plate (not shown) and a second side plate (not shown). The first side plate may be arranged axially between the biasing element 110 and the first seal 106. The first side plate may contact the biasing element 110 and the first seal 106. That is, the biasing element 110 may bias the first side plate into the first seal 106, which in turn biases the first seal 106 against the seal plate 104. The second side plate may be arranged axially between the biasing element 110 and the second seal 108. The second side plate may contact the biasing element 110 and the second seal 108. That is, the biasing element 110 may bias the second side plate into the second seal 108, which in turn biases the second seal 108 against the housing 102. The first and second side plates may be any suitable material, e.g., metal, plastic, etc. The first and second side plates may be formed separately from the seals 106, 108. Alternatively, each seal 106, 108 and the respective side plate may be integrally formed with each other using known manufacturing techniques, e.g., injection molding.

To assemble the seal arrangement 100, the housing 102 is provided. The second seal 108 is then inserted into the cavity 118 such that the second seal 108 contacts the second radially extending wall 128 and the second axially extending wall 126. The biasing element 110 is then inserted into the cavity 118 such that the biasing element 110 contacts the second seal 108 and is axially aligned with the first flow channel 140. The first seal 106 is then inserted into the cavity 118 such that the first seal 106 contacts the second axially extending wall 126 and the biasing element 110. The seal plate 104 is then provided such that the seal plate 104 contacts the axial side wall 116 of the housing 102 and the first seal 106. The seal plate 104 is then non-rotatably connected to the housing 102, e.g., the axial side wall 116. After assembly of the seal arrangement 100, the shaft 112 can be inserted into the cavity 118 to engage the seal arrangement 100. During engagement with the seal arrangement 100, the first outlet channel 144 of the shaft 112 is axially aligned with the biasing element 110 and the first flow channel 140, and the shaft 112 compresses the first and second seals 106, 108 radially against the second axially extending wall 126.

The seal arrangement 100 includes a first flow path 148, a second flow path 150, and a third flow path 152. The first seal 106 seals the first flow path 148 from the third flow path 152, and the second seal 108 seals the first flow path 148 from the second flow path 150. The first flow path 148 is bounded, at least in part, by the first and second seals 106, 108 and the first flow channel 140. That is, the first flow path 148 passes through the biasing element 110 between the first and second seals 106, 108 and into the first flow channel 140. Pressurized fluid may be supplied from the shaft 112, e.g., the first outlet channel 144, to the first flow path 148. By "bounded in part," we mean that a portion of the cited chamber, flow path, or other structure is bounded, or formed, by the cited element.

The second flow path 150 is bounded, at least in part, by the second flow channel 142, the second seal 108, and the housing 102. That is, the second flow path 150 passes through the second flow channel 142 and into the cavity 118. Pressurized fluid may be directed from the second flow path 150 between the end wall 132 and the shaft 112. Pressurized fluid directed from the second flow path 150 may exert an axial force on the second seal 108, as discussed above. In this situation, the biasing element 110 provides an opposite axial force to retain contact between the second seal 108 and the housing 102.

The third flow path 152 is bounded, at least in part, by the seal plate 104 and the first seal 106. That is, the third flow path 152 flows alongside the seal plate 104 and the first seal 106. Pressurized fluid may be directed from the third flow path 152 into the shaft 112, e.g., the second outlet channel 146. Pressurized fluid directed from the third flow path 152 may exert an axial force on the first seal 106, as discussed above. In this situation, the biasing element 110 provides an opposite axial force to retain contact between the first seal 106 and the seal plate 104.

Providing the seal arrangement with a spring configured to permit pressurized fluid to flow radially therethrough while biasing two seals axially away from each other allows the seal arrangement to reduce a likelihood of leakage through multiple seals as a result of a shuttling effect caused by a change in fluid pressure around either seal.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 seal arrangement
102 housing
104 seal plate
106 first seal
108 second seal
110 biasing element
112 shaft
114 radially outer surface
116 axial side wall
118 cavity
120 end
122 axially extending wall
124 radially extending wall
126 axially extending wall
128 radially extending wall
130 axially extending wall
132 end wall
134 radially extending portion
136 axially extending portion
138 radially extending portion
140 flow channel
142 flow channel
144 outlet channel
146 outlet channel
148 flow path
150 flow path
152 flow path
AR axis of rotation
AD1 axial direction
AD2 axial direction

What is claimed is:

1. A seal arrangement, comprising:
a housing defining a cavity and comprising:
a flow channel extending through the housing to the cavity;
an axially extending wall; and
a radially extending wall extending radially inwardly from the axially extending wall; and
a seal plate non-rotatably connected to the housing;
a biasing element disposed in the cavity and axially aligned with the flow channel, the biasing element being configured to permit fluid to flow radially therethrough into the flow channel;
a first seal disposed in the cavity and between the biasing element and the seal plate;
a second seal disposed in the cavity and between the biasing element and the radially extending wall;
a shaft, radially spaced from the housing and the seal plate and extending through the cavity, wherein:
the biasing element biases the first seal against the seal plate and the second seal against the radially extending wall;
wherein the housing includes a further flow channel extending through the housing and into the cavity, the second seal being arranged axially between the further flow channel and the flow channel;
wherein the further flow channel is configured to expel pressurized fluid toward the shaft; and
the housing is integrally formed from a single piece material.

2. The seal arrangement according to claim 1, further comprising a first flow path extending through the flow channel and between the first and second seals, and a second flow path spaced from the first flow path, the second flow path being sealed from the first flow path via the first seal.

3. The seal arrangement according to claim 2, wherein the biasing element is configured to maintain contact between the first seal and the seal plate in response to a change in fluid pressure in the second flow path.

4. The seal arrangement according to claim 3, further comprising a third flow path spaced from the first and second flow paths, the third flow path being sealed from the first flow path via the second seal.

5. The seal arrangement according to claim 4, wherein the biasing element is configured to maintain contact between the second seal and the radially extending wall of the housing in response to a change in fluid pressure in the third flow path.

6. The seal arrangement according to claim 2, wherein the first flow path passes through the biasing element.

7. The seal arrangement according to claim 1, wherein the shaft comprises an outlet channel configured to expel pressurized fluid, the biasing element being arranged radially between the outlet channel and the flow channel.

8. The seal arrangement according to claim 7, wherein the outlet channel is axially aligned with the flow channel.

9. The seal arrangement according to claim 1, wherein the biasing element is a wave spring.

10. The seal arrangement according to claim 1, wherein the shaft comprises an outlet channel configured to expel repressurized fluid, the first seal being arranged axially between the biasing element and the outlet channel.

11. The seal arrangement according to claim 1, wherein the flow channel is configured to receive pressurized fluid from the shaft.

12. The seal arrangement of claim 1, wherein the biasing element is arranged radially outside of the shaft.

13. The seal arrangement of claim 1, wherein:
the radial wall, the axial wall, the seal plate, and the shaft each form a portion of a ring-shaped cavity; and
the first seal, the second seal, and the biasing element are disposed in the ring-shaped cavity.

14. The seal arrangement of claim 13, wherein:
the cavity comprises the ring-shaped cavity; and
the flow channel extends into the ring-shaped cavity.

15. The seal arrangement of claim 13, wherein:
the first seal is a dynamic square seal with a chamfer arranged on a side facing the seal plate; and
the second seal is a dynamic square seal with a chamfer arranged on a side facing the radial wall.

16. The seal arrangement of claim 1, wherein:
the housing further comprises an end wall delimiting an axial end of the cavity; and
the shaft comprises an end disposed axially between the radial wall and the end wall.

* * * * *